United States Patent
Lee

(10) Patent No.: US 7,271,868 B2
(45) Date of Patent: *Sep. 18, 2007

(54) PLANE SWITCHING MODE LIQUID CRYSTAL DISPLAY DEVICE AND METHOD FOR MANUFACTURING THE SAME

(75) Inventor: Joun Ho Lee, Daegukwangyeok-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/004,103

(22) Filed: Dec. 6, 2004

(65) Prior Publication Data

US 2005/0094081 A1 May 5, 2005

Related U.S. Application Data

(62) Division of application No. 09/940,544, filed on Aug. 29, 2001, now Pat. No. 7,034,903.

(30) Foreign Application Priority Data

Aug. 30, 2000 (KR) ................................ 2000-50773

(51) Int. Cl.
*G02F 1/1343* (2006.01)
(52) U.S. Cl. ...................................... 349/141; 349/143
(58) Field of Classification Search ................ 349/141, 349/143, 54–55, 42–43
See application file for complete search history.

(56) References Cited

U.S. PATENT DOCUMENTS 5,600,460 A * 2/1997 Yamamoto et al. ............ 349/54
7,034,903 B2 * 4/2006 Lee .............................. 349/40

\* cited by examiner

*Primary Examiner*—Dung T. Nguyen
(74) *Attorney, Agent, or Firm*—McKenna Long & Aldridge LLP

(57) ABSTRACT

An in-plane switching mode LCD device and a method for manufacturing the same are disclosed, which can easily repair data line by forming dummy patterns to prepare an open region of data line during a process. The in-plane switching mode LCD device includes first and second substrates opposing each other and a liquid crystal layer therebetween, gate and data lines arranged to cross each other on the first substrate, a plurality of common electrodes and data electrodes for applying an electric field parallel to the substrate within a pixel region defined by the gate and data lines, and first and second dummy patterns integral with the common electrodes and respectively overlapping a portion of the data line defining the pixel region. If the data line has an open region, the data line is electrically connected with the first and second dummy patterns, while the portion of the common electrode integral with the first and second dummy patterns is insulated from the common line.

7 Claims, 5 Drawing Sheets

PLANE SWITCHING MODE LIQUID CRYSTAL DISPLAY DEVICE AND METHOD FOR MANUFACTURING THE SAME

This application is a divisional of prior application Ser. No. 09/940,544, filed Aug. 29, 2001 now U.S. Pat. No. 7,034,903, which claims priority to Korean Patent Application No. 2000-005 0773, filed Aug. 30, 2000, which are hereby incorporated by reference for all purposes as if fully set forth herein.

BACKGROUND OF THE INVENTION

1. Field of the Invention

The present invention relates to a display device, and more particularly, to an in-plane switching mode liquid crystal display (LCD) device and a method for manufacturing the same.

2. Discussion of the Related Art

A Cathode Ray Tube (CRT), one type of display devices, has been widely used for monitors of information terminals and measuring instruments including a television. However, it was difficult for the CRT to actively adapt to miniaturization and lightweight due to its weight and size.

A Liquid Crystal Display (LCD) device having a thin and small size has been actively developed in order to replace the CRT. Recently, the LCD device is used as a flat panel display device. Thus, demand for the LCD device has consistently increased.

In general, a low cost and high performance thin film transistor liquid crystal display (TFT-LCD) device uses an amorphous silicon thin film transistor as a switching device. At present, the LCD device is oriented towards a high resolution display that operates in a video graphic array (VGA) mode with the maximum resolution of 640×480 pixels, a super video graphic array (SVGA) mode of 800× 600 pixels or in an extended video graphic array (XVGA) mode of 1024×768pixels.

Development and application of TFT-LCD industries have been accelerated in accordance with increase of the dimensions and increase of the resolution. To increase the productivity and ensure the low cost, many efforts have been continued in view of simplified process steps and improvement of yield.

However, in spite of the trend toward a large sized area of the TFT-LCD, a problem arises in that contrast ratio depends on a viewing angle. To solve this problem, various LCDs such as a twisted nematic LCD provided with a retardation film and a multi-domain LCD have been proposed. However, a problem still arises in that contrast ratio and color depend on a viewing angle.

To ensure a wide-viewing angle, an in-plane switching mode LCD device that controls alignment of a liquid crystal by an electric field parallel to a substrate has been proposed.

FIG. 1 is a plan view of a related art in-plane switching mode LCD device. FIG. 2 is a sectional view taken along line I-I' of FIG. 1.

In the related art in-plane switching mode LCD device, as shown in FIG. 1 and FIG. 2, a gate line 1 is formed on a first substrate 10, and then a common line 3 is formed in parallel to the gate line 1. A common electrode 9 extends from the common line 3 to a pixel region.

In addition, a gate insulating film 12 is formed on an entire surface of the first substrate including the gate line 1, the common line 3, and the common electrode 9.

A data line 2 crosses the gate line 1 on the gate insulating film 12, so that a plurality of pixel regions are defined. For reference, FIG. 1 shows a unit pixel.

A thin film transistor (TFT) is formed on the gate insulating film 12 of a region where the gate line 1 crosses the date line 2. The TFT includes gate electrode, gate insulating film, semiconductor film, and source/drain electrodes.

A data electrode 8 is formed on the gate insulating film 12 within the pixel region. At this time, the data electrode 8 is arranged in parallel to the common electrode 9, and between the common electrodes 9. Also, the data electrode has an overlapping portion between the common line 3 and the common electrode 9 to form a storage capacitor. The data electrode 8 is connected with the drain electrode 7 of the TFT.

A passivation film 13 is formed on the gate insulating film 12 including the TFT, the data line 2, and the data electrode 8.

A color filter 21 is formed on a second substrate 20, and a liquid crystal layer 22 is formed between the first and second substrates 10 and 20.

Although not shown, polarizers are formed on external surfaces of the substrates 10 and 20 to polarize transmitted light, and alignment films adjacent to the liquid crystal layer are formed on internal surfaces of the substrates 10 and 20 to control an alignment direction of the liquid crystal layer.

A method for operating the related art in-plane switching mode LCD will be described in detail.

In the aforementioned related art in-plane switching mode LCD device, if a voltage is applied from an external driving circuit (not shown), an electric field parallel to the substrates 10 and 20 is generated between the data electrode 8 and the common electrode 9. A liquid crystal molecule aligned within the liquid crystal layer 22 is rotated along the electric field parallel to the substrates. As a result, an amount of light that passes through the liquid crystal layer 22 is controlled and gray scale is displayed in a state that the liquid crystal molecule is parallel to the substrate. For this reason, the difference of light transmittance depending on a viewing angle is reduced.

However, the related art in-plane switching mode LCD device has the following problems.

During the process, if the data line has an open region due to foreign particles, an extra repair line has to be installed by an additional process for repairing.

It is difficult to install the extra repair line. Even though the extra repair line is installed, the process is very complicated, thereby degrading reliability of the device.

SUMMARY OF THE INVENTION

Accordingly, the present invention is directed to an in plane switching mode LCD device that substantially obviates one or more problems due to limitations and disadvantages of the related art.

An object of the present invention is to provide an in plane switching mode LCD device and a method for manufacturing the same that can easily repair data line by forming dummy patterns to prepare an open region of data line during a process.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an in-plane switching mode LCD device includes first and second substrates arranged to opposing each other; a liquid crystal layer between the first and second substrates, gate and data lines arranged to cross each other on the first substrate, a plurality of common electrodes and data electrodes for applying an electric field parallel to the first substrate within a pixel region defined by the gate and data lines, and first and second dummy patterns integral with at least one of the common electrodes respectively overlapping first and second portions of the data lines defining the pixel region.

In another aspect of the present invention, a method for manufacturing an in-plane switching mode LCD device according to the present invention includes the steps of forming a gate line, a gate electrode, a common elect-rode, first and second dummy patterns integral with the common electrode, and a common line on a first substrate; forming a gate insulating film on an entire surface of the first substrate including the first and second-dummy patterns and the common electrode, forming a data line crossing the gate line to partially overlap the first and second dummy patterns, forming a data electrode integral with the data line; forming a passivation film on the entire surface including the data line and the data electrode, and forming a liquid crystal layer between the first substrate and a second substrate opposite to the first substrate.

In such an in-plane switching mode LCD device of the present invention, if a data line has an open region, it can be repaired using a common electrode. That is, when the common electrode is patterned, a dummy pattern of the common electrode material is formed to overlap the data line, so that a signal disconnected by an open region is bypassed using the dummy pattern and the common electrode, thereby forming a path for transmitting the signal.

Generally, in a pixel unit, a gate line is long enough to have an open region. However, the data line is long enough that an open region may be caused by foreign particles during the manufacturing process. That is, in a single pixel unit, the length of the data line and the gate line are substantially the same. In an XGA, there are 768 gate lines and 1024*3 data lines. Therefore, the overall length of the data lines is greater than that of gate lines. Thus, the data lines may have a large number of open regions compared to the gate lines.

Accordingly, the signal of the data line is bypassed through the dummy pattern which is integral with the common electrode, so that a problem of the open region can be solved.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrates in the accompanying drawings.

Figure 1:
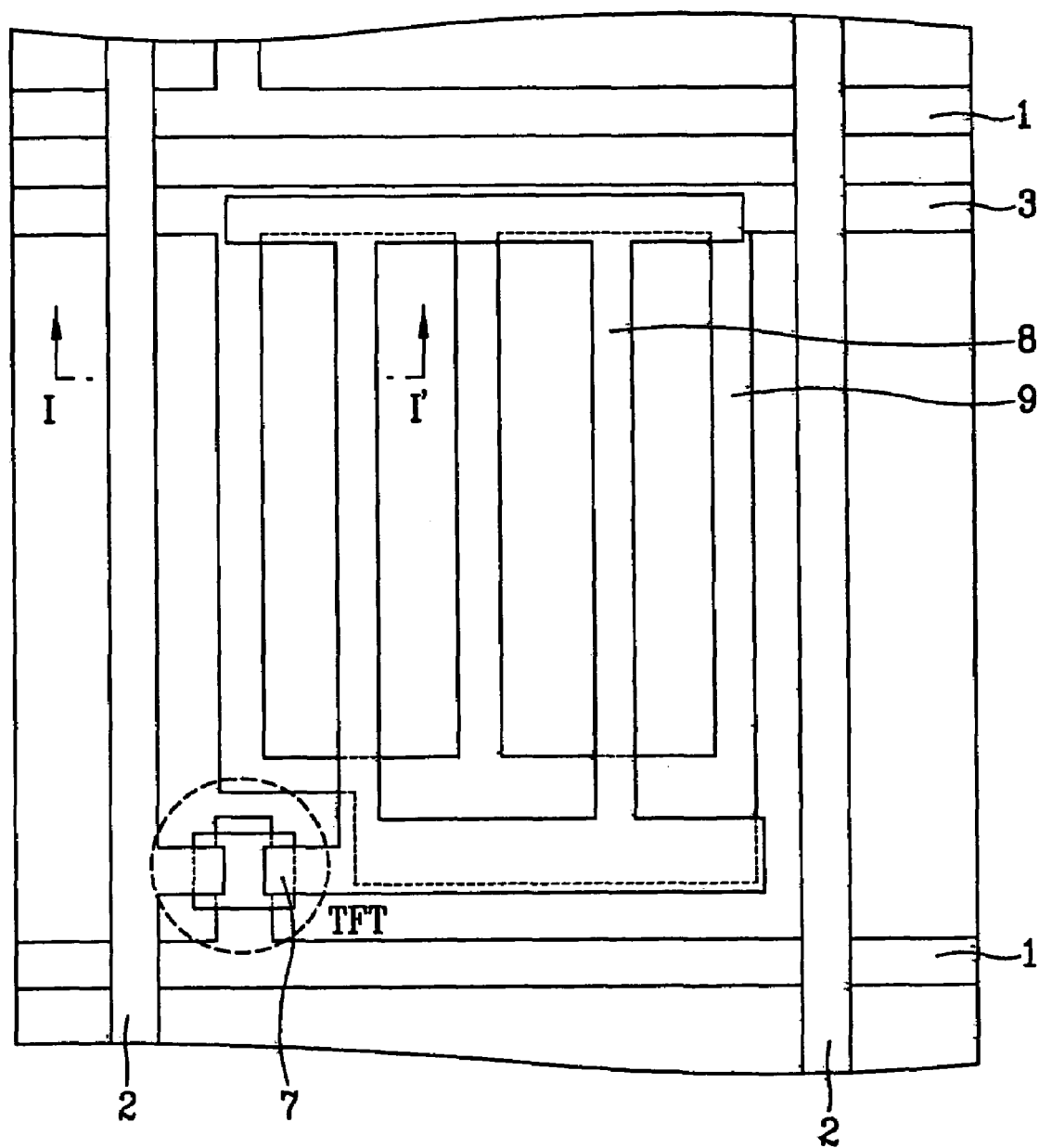
FIG. 1 is a plan view of a related art in-plane switching mode LCD device.
Figure 2:
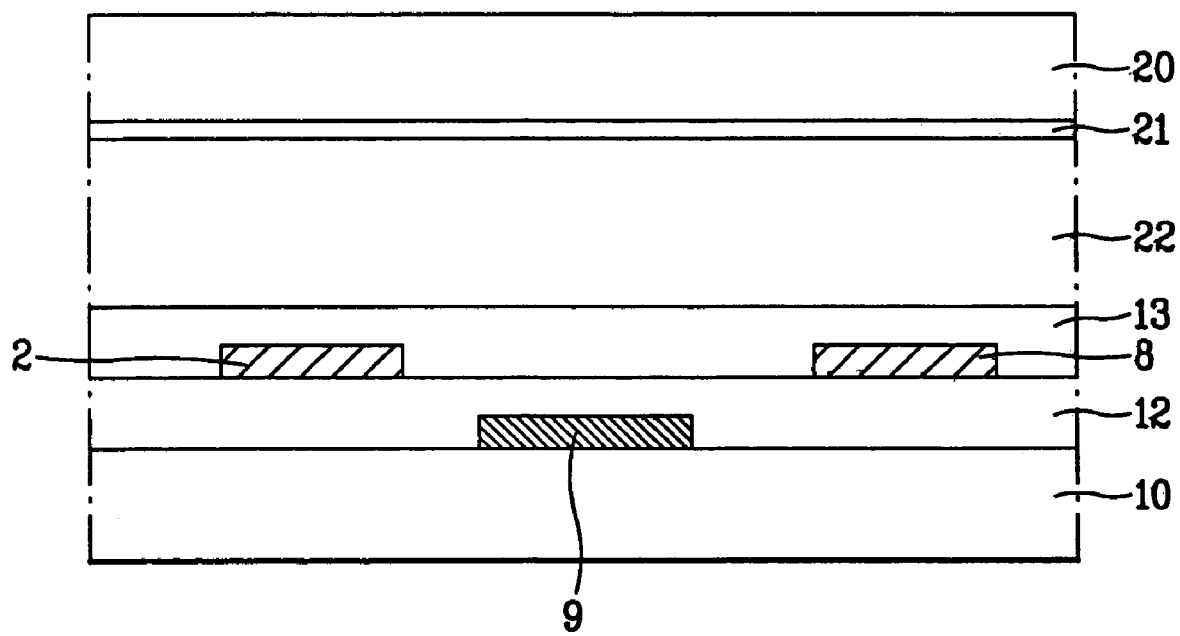
FIG. 2 is a sectional view taken along line I-I' of FIG. 1.
Figure 3:
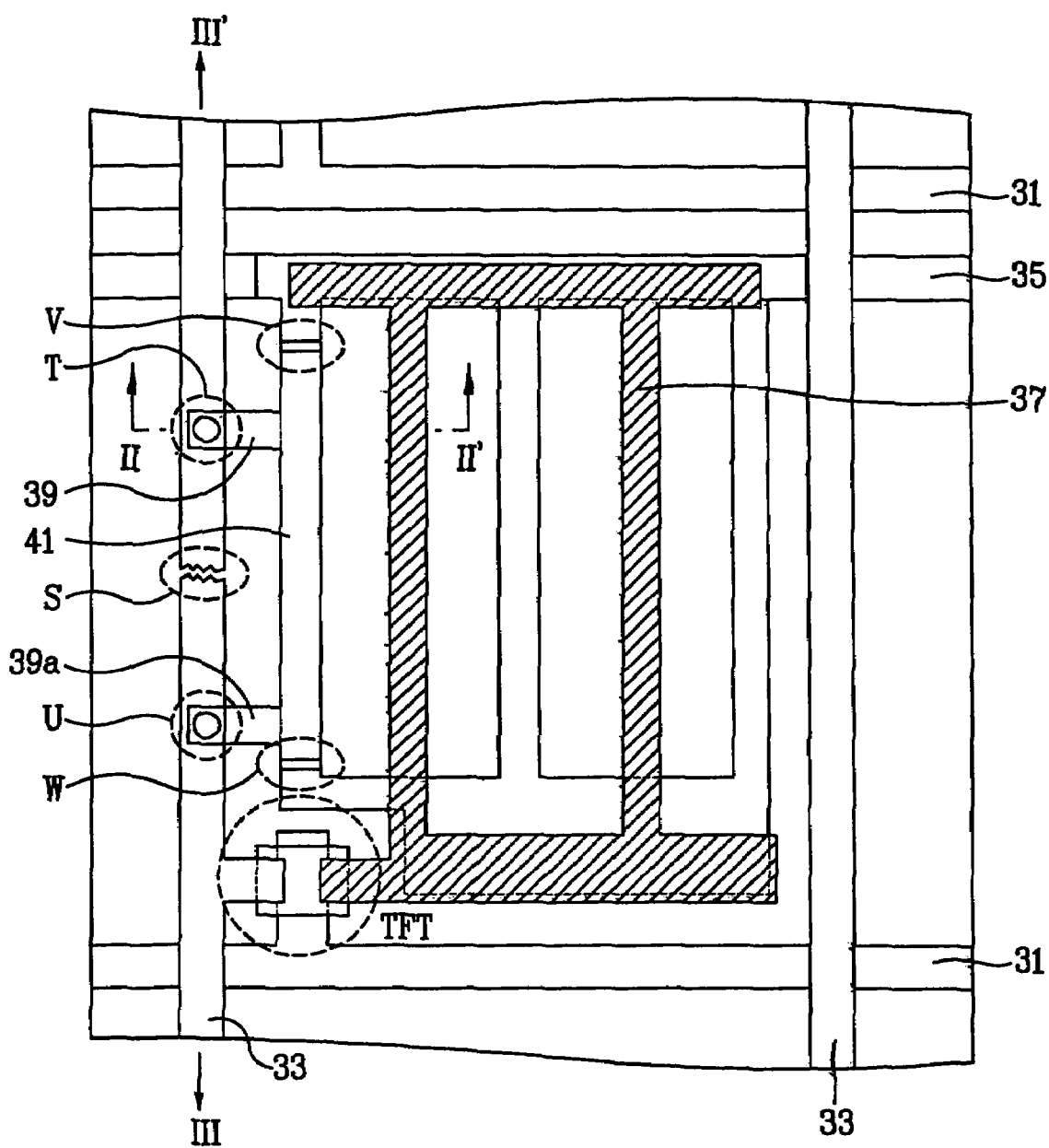
FIG. 3 is a plan view of the in-plane switching mode LCD device according to the present invention.
Figure 4:
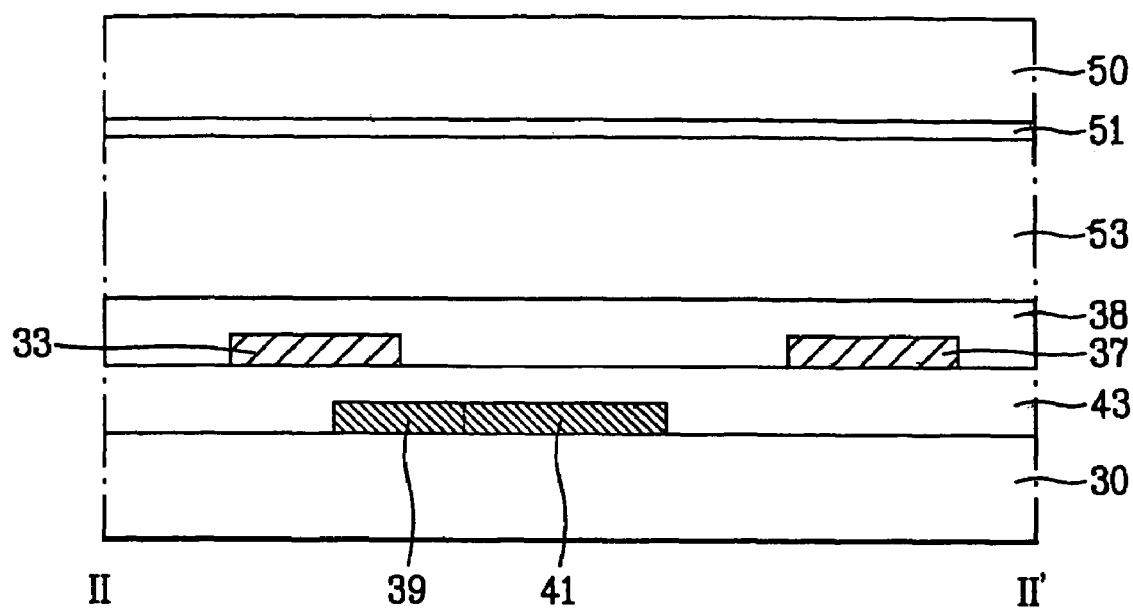
FIG. 4 is a sectional view taken along line II-II' of FIG. 3.
Figure 5:
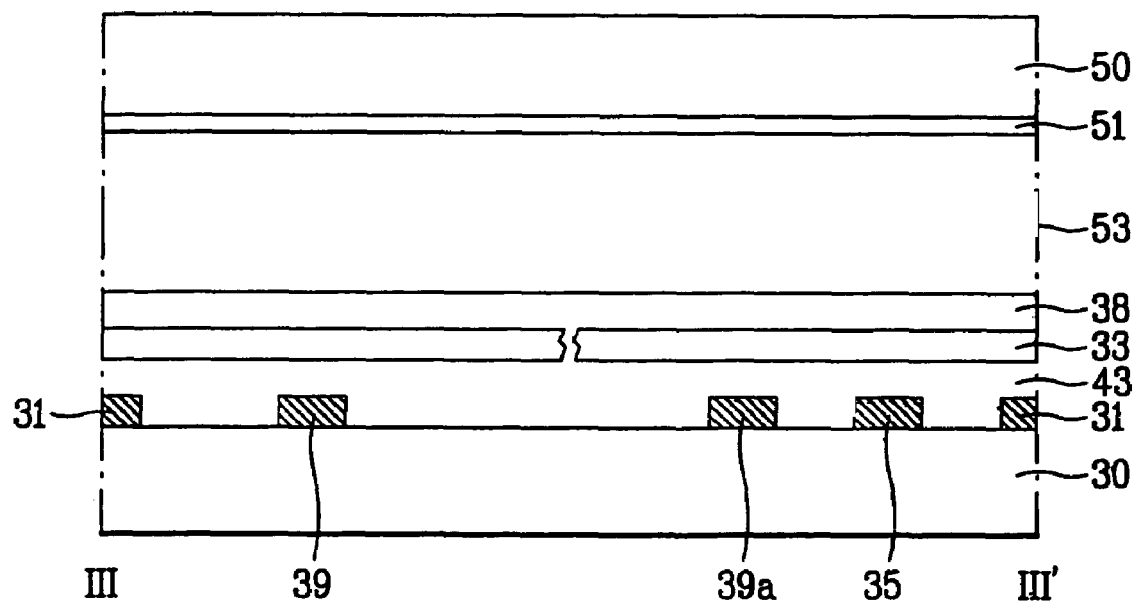
FIG. 5 is a sectional view taken along line III-III' of FIG. 3.

FIG. 3 is a plan view of the in-plane switching mode LCD device according to the present invention. FIG. 4 is a sectional view taken along line II-II' of FIG. 3. FIG. 5 is a sectional view taken along line III-III'FIG. 3. First, as shown in FIG. 3, gate and data lines 31 and 33 are formed on a first substrate 30. The gate and data lines 31 and 33 cross each other at a predetermined distance for defining a plurality of pixel regions. Then, a common line 35 is formed in parallel to the gate line 31 within the pixel region. A thin film transistor (TFT) is formed in a portion where the gate line 31 crosses the data line 33. Subsequently, a data electrode 37 is formed in parallel to the data line 33 within the pixel region, which is electrically connected with a drain electrode of the TFT. Then, a common electrode 41 is connected with the common line 35 and formed in parallel to the data electrode 37. First and second dummy patterns 39 and 39a are integral with the common electrode. Also, one portion of each of the first and second dummy patterns overlaps the data line 33.

At this time, as shown, the data line 33 may have an open region in the middle ("S" portion) of the data line defining a unit pixel. Accordingly, the first and second dummy patterns 39 and 39a are respectively formed at both sides of the middle portion of the data line, thereby forming a signal path inclusive of the data line 33, the first dummy pattern 39, the common electrode 41, and the second dummy pattern 39a.

Meanwhile, the data electrode 37 partially overlaps the common line 35 and the common electrode 41 to form a storage capacitor. The degree of overlap between the dummy pattern 39 and the data line 33 is determined by the degree of load of the data line according to a predetermined model. For reference, FIG. 3 shows a unit pixel.

A sectional structure of the in-plane switching mode LCD device is shown in FIG. 4 to FIG. 5.

The gate line 31 (not shown in FIG. 4) is formed in one direction on the first substrate 30, and then common line 35 is formed in parallel to the gate line 31. At this time, the first dummy pattern 39 is formed to be extended to a portion of the data line 33, and the common electrode 41 is formed integrally with the first dummy pattern 39.

The gate insulating film 43 is formed on the entire surface of the first substrate including the gate line 31, the common electrode 41, the first and second dummy patterns 39 and 39a, and common line 35. The data line 33 crosses the gate line 31 to partially overlap the first dummy pattern 39 on the gate insulating film 43. Then, the data electrode 37 is formed on the gate insulating film 43 within the pixel region, and the passivation film 38 is formed on the entire surface of the first substrate including the data electrode 37 and the data line 33.

The first and second dummy patterns 39 and 39a are the same material as that of the common electrode 41, which is generally formed of a transparent conductive material such as an Indium Tin Oxide (ITO). And the outmost common electrode may be formed of metal or of ITO on the above. Also, the common electrode 41 is electrically connected with the common line 35 on the first substrate 30. The data electrode 37 is formed on the gate insulating film 43, and, at the same time, source/drain electrodes are formed on the gate insulating film 43. Then, the data electrode 37 is connected with the drain electrode.

On the second substrate 50, a light shielding layer (not shown) and a color filter layer 51 are formed. The light-shielding layer is to shield light leaked from the TFT, the gate line and the data line. The color filter layer 51 is to display colors. Then, the liquid crystal layer 53 is formed between the first and second substrates 30 and 50. Also, although not shown, polarizers are formed on external surfaces of the substrates 30 and 50 to polarize transmitted light, and alignment films attached to the liquid crystal layer are formed on internal surfaces of the substrate 30 and 50 to control an alignment direction of the liquid crystal layer.

In such an in-plane switching mode LCD device according to the present invention, if the data line has an open region ("S" portion of FIG. 3), the data line 33 is electrically connected with the first and second dummy patterns by a laser welding ("T" and "U" portions of FIG. 3), while a portion ("V" and "W" portions) connected with the common line 35 among the common electrode 41 is cut off by a laser, thereby electrically insulating the common electrode 41 from the common line 35.

Accordingly, video signals applied from a driving circuit are transmitted through a path in the order of the data line 33, the first dummy pattern 39, the common electrode 41 disconnected from the common line 35, the second dummy pattern 39a, and the data line 33.

A method for manufacturing the in-plane switching mode LCD device of the present invention will be described with reference to FIG. 6A to FIG. 6D. For reference, sectional views shown in FIG. 6A to FIG. 6D are taken along line II-II' of FIG. 3.

Figure 6A:
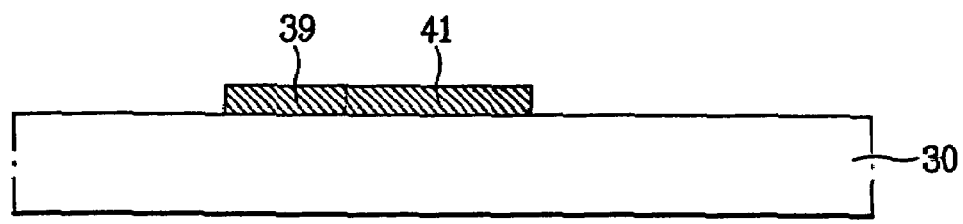
FIG. 6A to FIG. 6D are showing manufacturing process steps of the in-plane switching mode LCD device according to the present invention.

First, as shown in FIG. 6A, a conductive material such as Al, Mo, Ta, Al alloy or ITO is formed on the first substrate 30 by a sputtering process, and then the gate line 31, the gate electrode, the common electrode 41 and the common line 35 are formed by a photolithography process. At this time, the common line 35 is formed in parallel to the gate line 31. The common electrode 41 is formed integrally with the first and second dummy patterns 39 and 39a (not shown) that extend to a region where the data line 33 will be formed to overlap with the data line 33 at a predetermined portion. That is, the first and second dummy patterns 39 and 39a are the same material as that of the common electrode 41. The first and second dummy patterns 39 and 39a are patterned at the same time as the common electrode 41 by the photolithography process.

Figure 6B:
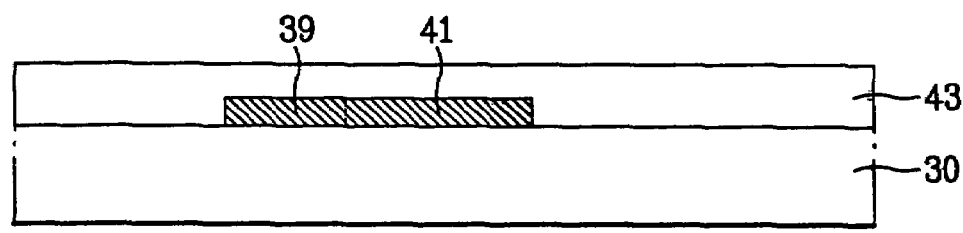
Figure 6C:
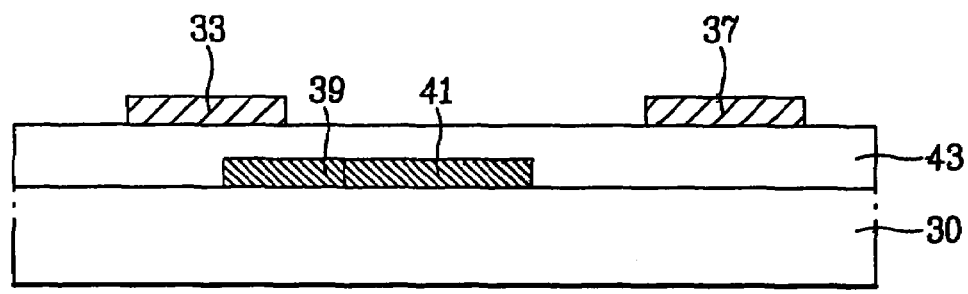

As show in FIG. 6B, the gate insulating film 43 of $SiN_x$ or $SiO_x$ is formed on an entire surface of the first substrate 30 including the common electrode 41 and the gate line 31 by a plasma chemical vapor deposition ACVD) process.

As shown in FIG. 4C, a metal such as Al, Cr, Ti, and Al alloy is formed on the gate insulating film 43, and then crosses the gate line 31 by the photolithography process. Also, data line 33 is formed to overlap the first and second dummy patterns 39 and 39a, and then the data electrode 37 is formed substantially in parallel to the data line 33 within the pixel region.

Figure 6D:
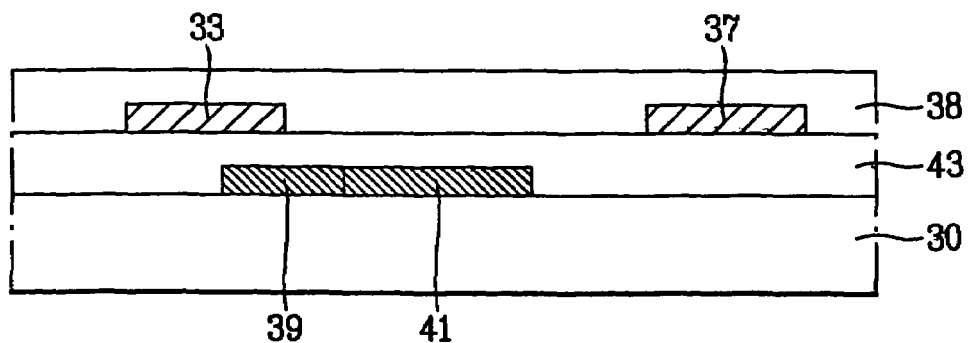

As shown in FIG. 6D, a passivation film 38 is of an inorganic material such as $SiN_x$ and $SiO_x$ or an organic material such as Benzocyclobutene (BCB) and Acryl is formed on the entire surfaces including the data line 33 and the data electrode 37. After that, the liquid crystal layer is injected between the second substrate 50 and the first substrate 30, 50 that the manufacturing process steps are completed.

Additionally, it is possible to form the alignment film on the first and second substrates 30 and 50. After polyamide, a polyimide-based compound, polyvinylalcohol (PVA), or polyamic acid is deposited on the first and second substrates 30 and 50, rubbing may be performed to determine the alignment direction. After a photo-alignment material such as polysiloxanecinnamate, polyvinylcinnamate, and cellulosecinnamate is formed on the first and second substrates 30 and 50, light may be irradiated to determine the alignment direction and the pretilt angle. At this time, polarized light, non-polarized light, unpolarized light or partially polarized light, is irradiated one or more time. Preferably, ultraviolet rays are used.

According to the in-plane switching mode LCD device of the present invention and the method for manufacturing the same, if the data line 33 has the open region, the portion that the data line 33 is overlapped with the first and second dummy patterns 39 and 39a is electrically connected with each other by a laser welding, and the common electrode 41 formed integral with the first and second dummy patterns 39 and 39a is electrically insulated from the common line 35 by a laser cutting. Accordingly, once the open region of the data line is generated, a signal path is bypassed in the order of the data line 33, the first dummy pattern 39, the common electrode 41 (electrically disconnected from the common line), the second dummy pattern 39a, and the data line 33, thereby repairing the open region of the data line.

As aforementioned, in the in-plane switching mode LCD device and the method for manufacturing the same according to the present invention, the dummy patterns are formed in a single body with the common electrode to overlap the data line during forming the common electrode for repairing the open region of the data line, so that the open region of the data line can be easily repaired by a laser welding and a laser cutting without an additional process for forming an extra repair line.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method for manufacturing an in-plane switching mode liquid crystal display device comprising:

forming a gate line, a gate electrode, a common electrode, at least one dummy pattern, and a common line on a first substrate;

forming a gate insulating film on an entire surface of the first substrate;

forming a data line crossing the gate line to partially overlap the dummy pattern;

forming a data electrode integral with the data line;

forming a passivation film on the entire surface of the first substrate including the data line and the data electrode; and forming a liquid crystal layer between the first substrate and a second substrate opposite to the first substrate;

wherein the dummy pattern is integral with the common electrode.

2. The method as claimed in claim 1, further comprising forming a common line in parallel to the gate line.

3. The method as claimed in claim 1, further comprising electrically connecting the data line with the dummy pattern.

4. The method as claimed in claim 3, wherein the overlapped portion between the data line and the dummy pattern is electrically connected with the data line.

5. The method as claimed in claim 1, further comprising electrically insulating a portion of the common electrode from the common line.

6. The method as claimed in claim 1, wherein the common electrode and the dummy pattern are formed of a transparent conductive material.

7. The method as claimed in claim 6, wherein the transparent conductive material includes indium tin oxide.

* * * * *